Aug. 6, 1929.  J. R. YOUNG  1,723,114
BELT CLAMP
Filed April 10, 1928
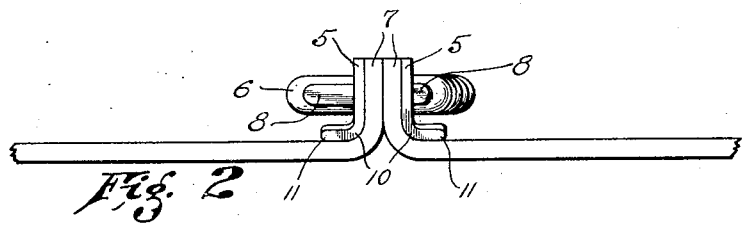
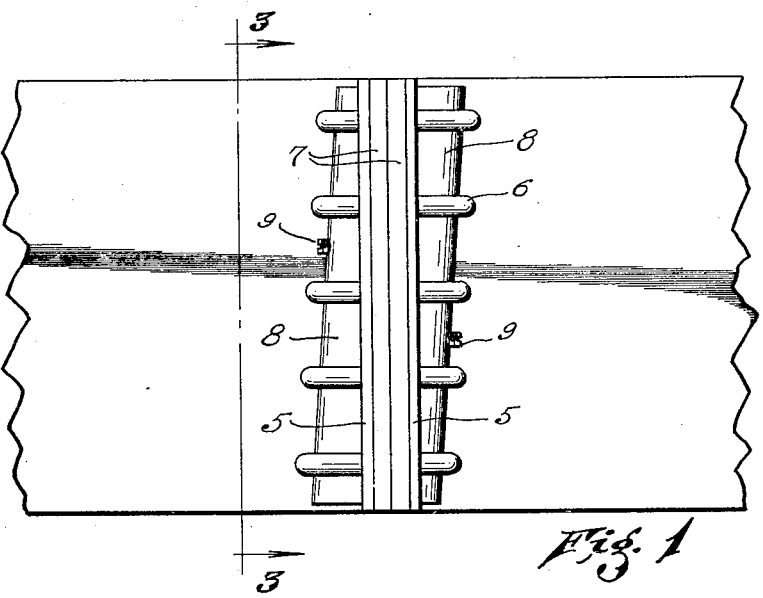
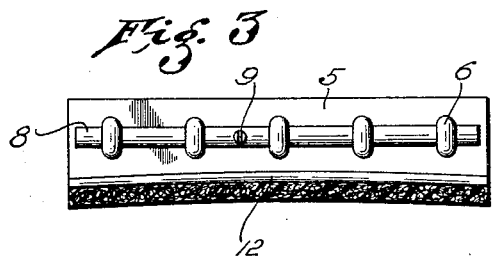
INVENTOR:
John Richard Young,
By Arthur J. Farnsworth.
ATTORNEY Patented Aug. 6, 1929.

1,723,114

UNITED STATES PATENT OFFICE.

JOHN RICHARD YOUNG, OF WHITTIER, CALIFORNIA.

BELT CLAMP.

Application filed April 10, 1928. Serial No. 268,920.

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to clamps for joining or splicing belts that are used for the transmission of power. Its principle objects are; first, to produce a device of this nature that can be used without in any way reducing the tensile strength of the belt to which it is applied; second, to provide a belt clamp that can be applied very quickly, and with a minimum of effort; and, third, to accomplish the above in a very simple and relatively inexpensive construction.

My objects are attained in the manner illustrated in the accompanying drawings, in which—

Figure 1 is a plan view of a belt joined by means of my improved clamp;

Figure 2 is a side elevation of the belt, and an end view of the clamp shown in Figure 1; and Figure 3 is a side elevation of the clamp, and a section of the belt taken on the line 3—3 of Figure 1.

Similar reference numerals refer to similar parts throughout the several views.

In joining belt ends in any of the usual or well known ways, other than by making a lapped and glued splice, the belt is necessarily weakened in one way or another, as by punching it for lacing, or by driving rivets through it. This naturally results in reducing the power that can be safely transmitted by the belt. Lapped and glued splices undoubtedly are very satisfactory when properly made, but they entail much loss of time for the purpose of first preparing the joint-ends, and then for allowing the glue to set. Moreover a considerable portion of the belt material is required for the splice, and, if the object is merely to tighten a belt that has become too slack by service, there often is not sufficient material in the slack to allow of making a proper lapped splice.

My belt clamp comprises a pair of opposed angular pieces 5, which are suitably slotted for passing a series of links 6 there-through. The belt ends 7 are similarly slotted by means of a suitable punch, are turned outwardly, and are brought together between the two angle-pieces as shown in Figures 1 and 2. Links 6 are then passed through the respective slots, and a tapered key 8 is passed through the link ends at each side of the joint from opposed directions. Thus the tapered sides of the keys are parallel, and the dimensions of the links are uniform. The respective keys are driven home by a few hammer blows upon them alternately, and in this way the belt ends are very tightly compressed between the opposed faces of angle-pieces 5. Set screws 9 are provided in the keys, and these are set up after the keys are driven home, to make certain that the keys will not subsequently back off and become loosened by the stresses and vibrations of service.

The corners 10 and 11 of the angle-pieces are well rounded, to prevent any possibility of their cutting into the belt, and the lower legs of the angles are concaved, as shown at 12 in Figure 3, to correspond to the crowning of the pulleys upon which the belt is to run.

It will be obvious from the above description that no part of the active material of the belt that is subjected to tension has been weakened in any way, since the slots for accommodating the links 6 are well up within the grip of the angle pieces 5. The full strength of the belt is thus maintained where it is joined. It will also be seen that only a relatively small amount of belt material is required for the joint and this is readily supplied by the slack in the belt that is to be taken up. Finally it will be appreciated that the clamp I have described may be applied with small effort in a very short time.

I claim as my invention:

1. A belt clamp comprising; a pair of angle bars having opposed legs and opposed slots therethrough; a plurality of links of uniform size extending through said slots; and a wedge bar extending through the ends of the links on each side of the clamp, whereby said legs may be tightly drawn together; said wedge bars being inserted through the respective link-ends from opposite directions, and having their respective wedge surfaces parallel to each other.

2. A belt clamp comprising; a pair of opposed clamping bars having a plurality of opposed slots therethrough; links of uniform length extending through said slots; a wedge bar extending through the ends of the links on each side of the clamp, whereby the clamping bars may be drawn together to tightly compress material between them; and means for retaining the wedge bars in position with respect to the clamping bars; said wedge bars being inserted through the respective link-ends from opposite directions, and having their respective wedge surfaces parallel.

3. In combination; a pair of opposed belt-ends, having a plurality of opposed slots therethrough; a pair of correspondingly slotted clamping bars outside of the belt-ends; links of uniform length extending through the slots in the belt-ends and clamping bars; wedge bars extending through the respective link-ends and bearing against the clamping bars; and means for retaining the wedge bars in position with respect to the clamping bars; said wedge bars being inserted through the respective link-ends from opposite directions, and having their respective wedge surfaces parallel.

4. A belt clamp comprising; a pair of opposed clamping bars, at least one of which is transversely slotted; links extending through said slots and engaging the other clamping bar; and a wedge bar extending through said links and bearing against the slotted clamping bar, whereby the two clamping bars may be drawn together to tightly compress a pair of belt-ends between them; one pair of the opposed edges of the clamping bars being slightly concaved to enable a belt that is clamped between these bars to run properly over crowned pulleys.

JOHN RICHARD YOUNG.